(12) United States Patent
Stenneth et al.

(10) Patent No.: US 11,898,870 B2
(45) Date of Patent: Feb. 13, 2024

(54) APPARATUS AND METHODS FOR PROVIDING A ROUTE USING A MAP LAYER OF ONE OR MORE SOUND EVENTS

(71) Applicant: HERE GLOBAL B.V., Eindhoven (NL)

(72) Inventors: Leon Stenneth, Chicago, IL (US); Jerome Beaurepaire, Berlin (DE); Jeremy Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 236 days.

(21) Appl. No.: 17/465,315

(22) Filed: Sep. 2, 2021

(65) Prior Publication Data
US 2023/0062200 A1    Mar. 2, 2023

(51) Int. Cl.
| | | |
|---|---|---|
| *G01C 21/00* | (2006.01) | |
| *G01C 21/34* | (2006.01) | |
| *G01C 21/36* | (2006.01) | |
| *G01C 21/32* | (2006.01) | |

(52) U.S. Cl.
CPC ......... *G01C 21/3889* (2020.08); *G01C 21/32* (2013.01); *G01C 21/3492* (2013.01); *G01C 21/3661* (2013.01); *G01C 21/3837* (2020.08)

(58) Field of Classification Search
CPC ............... G01C 21/3889; G01C 21/32; G01C 21/3492; G01C 21/3661; G01C 21/3837; G01C 21/3822; G01C 21/3461
See application file for complete search history.

(56) References Cited

U.S. PATENT DOCUMENTS

| | | | |
|---|---|---|---|
| 9,870,764 B2 | 1/2018 | Marti et al. | |
| 10,403,141 B2 | 9/2019 | Patil et al. | |
| 2016/0379621 A1* | 12/2016 | Marti | H04K 3/45 |
| | | | 381/71.4 |
| 2019/0220248 A1 | 7/2019 | Maruri et al. | |
| 2020/0132484 A1* | 4/2020 | Akselrod | G01C 21/3461 |
| 2020/0149907 A1* | 5/2020 | Iwaasa | G07C 5/008 |
| 2020/0379108 A1 | 12/2020 | Vijayalingam et al. | |
| 2021/0248911 A1* | 8/2021 | Shimodaira | G06F 16/29 |
| 2021/0293573 A1* | 9/2021 | Sofman | G01C 21/3469 |
| 2022/0309461 A1* | 9/2022 | Wang | G06Q 10/047 |

FOREIGN PATENT DOCUMENTS

| | | | |
|---|---|---|---|
| KR | 1020160039951 A | | 4/2016 |
| WO | WO 2012097150 A1 | | 7/2012 |

* cited by examiner

*Primary Examiner* — Jess Whittington
*Assistant Examiner* — Brian E Yang
(74) *Attorney, Agent, or Firm* — Peter H. Yu; HERE GLOBAL B.V.

(57) ABSTRACT

An apparatus, method and computer program product provide a route using a map layer of one or more sound events. For example, the apparatus receives a user preference indicating a sound type, identifies a road segment associated with the sound type from a plurality of road segments, selects a subset from the plurality of road segments as a route based on association of the subset with respect to the road segment, and outputs the route.

14 Claims, 12 Drawing Sheets

APPARATUS AND METHODS FOR PROVIDING A ROUTE USING A MAP LAYER OF ONE OR MORE SOUND EVENTS

TECHNICAL FIELD

The present disclosure generally relates to the field of audio classification, associated methods and apparatus, and in particular concerns, for example, an apparatus configured to provide a route as a function of a user's sound preference by using a map layer of one or more sound events.

BACKGROUND

As vehicles traverse a road network, sound events occurring within a proximity thereof may provide contextual information to vehicle operators and influence a way in which the vehicles are maneuvered. By way of example, vehicle operators may cause the vehicles to slow down when the vehicle operators hear a siren or a sound of children playing. Further, vehicle operators may prefer to hear certain sound events and cause the vehicles to move closer to locations including those sound events. However, the vehicle's operator may not readily detect certain sound events and alter a route for the vehicle in view of such sound events.

The listing or discussion of a prior-published document or any background in this specification should not necessarily be taken as an acknowledgement that the document or background is part of the state of the art or is common general knowledge.

BRIEF SUMMARY

According to a first aspect, an apparatus including at least one processor and at least one non-transitory memory including computer program code instructions is described. The computer program code instructions are configured to, when executed, cause the apparatus to receive a user preference indicating a sound type, identify a road segment associated with the sound type from a plurality of road segments, select a subset from the plurality of road segments as a route based on association of the subset with respect to the road segment, and output the route.

According to a second aspect, a non-transitory computer-readable storage medium having computer program code instructions stored therein is described. The computer program code instructions, when executed by at least one processor, cause the at least one processor to identify a road segment associated with a sound type from a plurality of road segments forming a route, track a location of a vehicle with respect to the road segment, and in response to the vehicle being within the road segment, cause: (i) a user device associated with the vehicle to cause a notification associated with the road segment; (ii) the vehicle to enable external sound to be provided to an occupant of the vehicle; or (iii) a combination thereof. The sound type is selected based on a user preference.

According to a third aspect, a method of updating a map layer for providing a route based on a user's sound preference is described. The method includes collecting sound data captured by a sound capturing device at or proximate to a road segment and determining whether the sound data correspond to a sound type stored in a database including a map layer. The method further includes generating a data point for the map layer in response to the sound data corresponding to the sound type and storing the data point in the database. The data point associates the sound type to the road segment, and the map layer includes the data point and one or more other data points that associate the sound type or one or more other sound types to one or more other road segments Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 10 illustrates a diagram of exemplary components of a mobile terminal for communications, which is capable of operating in the system of FIG. 1A.

DETAILED DESCRIPTION

Sounds generated within a road network can provide contextual information for vehicle operators. For example, sound events defined by sirens, vehicle horns, human voices, construction work, etc. may influence a way of which the vehicle operators maneuver the vehicles through a road network, such as decreasing the speed of the vehicle, causing the vehicles to encounter locations including the sound events, causing the vehicles to avoid locations including the sound events, etc. However, a range at which a vehicle operator may detect a sound event is limited based on various factors, such as a degree of which a vehicle cabin is audibly isolated from an external environment, presence of one or more interfering sounds and sound attributes thereof, a human hearing range, etc. Additionally, even if a sound event is detected, the vehicle operator may not be able to immediately identify a location of a source that is generating the sound and appropriately react to the detected sound event. If the detected sound event requires a response of cautious maneuvers, a likelihood of an accident may increase. Such likelihood may further increase when the vehicle operator moves his/her field-of-vision (FOV) in search of the source. Additionally, since sound is temporary and a sound detection range for a vehicle operator is inherently limited, the vehicle operator's choice of route cannot be readily influenced based on a user's sound preference.

There will now be described apparatus and associated methods that may address these issues.

Figure 1A:
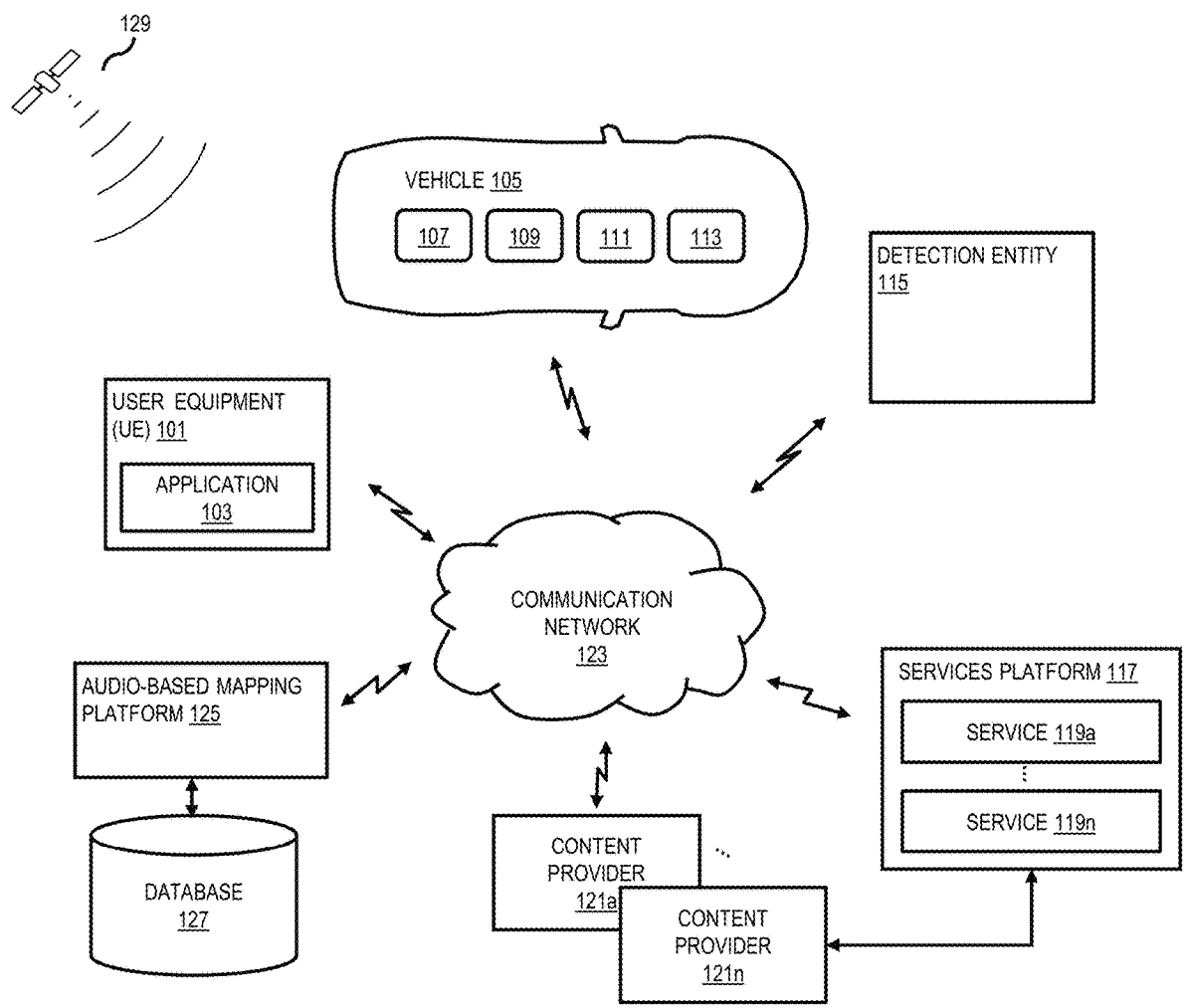
FIG. 1A illustrates a diagram of a system capable of providing a route as a function of a user's sound preference by using a map layer for one or more sound events.

FIG. 1A is a diagram of a system 100 capable of providing a map layer of one or more sound events, according to one embodiment. The system includes a user equipment (UE) 101, a vehicle 105, a detection entity 115, a services platform 117, content providers 121a-121n, a communication network 123, an audio-based mapping platform 125, a database 127, and a satellite 129. Additional or a plurality of mentioned components may be provided.

In the illustrated embodiment, the system 100 comprises a user equipment (UE) 101 that may include or be associated with an application 103. In one embodiment, the UE 101 has connectivity to the audio-based mapping platform 125 via the communication network 123. The audio-based mapping platform 125 performs one or more functions associated with classifying sound events and providing a map layer based on the classified sound events. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including the vehicle 105), or any combination thereof, including the accessories and peripherals of these devices. In one embodiment, the UE 101 may be a head-up display (HUD) system that is associate with or integrated with the one or more vehicles. In one embodiment, the UE 101 can be an in-vehicle navigation system, a personal navigation device (PND), a portable navigation device, a cellular telephone, a mobile phone, a personal digital assistant (PDA), a watch, a camera, a computer, etc. In one embodiment, the one or more vehicles may have cellular or Wi-Fi connection either through the inbuilt communication equipment or from the UE 101 associated with the vehicles. It should be appreciated that the UE 101 can support any type of interface to the user (such as "wearable" devices, etc.).

In the illustrated embodiment, the application 103 may be any type of application that is executable by the UE 101, such as a navigation application, a mapping application, a location-based service application, a content provisioning service, a camera/imaging application, a media player application, a social networking application, a calendar application, or any combination thereof. In one embodiment, one of the applications 103 at the UE 101 may act as a client for the audio-based mapping platform 125 and perform one or more functions associated with the functions of the audio-based mapping platform 125 by interacting with the audio-based mapping platform 125 over the communication network 123. In one embodiment, a user may access the application 103 through the UE 101 for performing functions associated with the audio-based mapping platform 125 and/or receiving information regarding the functions. In one embodiment, a user may input via the application 103 a user preference regarding one or more types of sound, and the audio-based mapping platform 125 may output route information to the user through the application 103 by using a map layer that associates sound events to one or more road segments. In one embodiment, the application 103 may assist in conveying information regarding at least one attribute associated a road segment and/or a travel link via the communication network 123. Such information may indicate one or more sound events associated with the road segment. Herein, a travel link includes road segments (e.g., a stretch of road), nodes (e.g., points where two or more road segments connect). The travel link may indicate a navigational route to a destination selected by a user.

The vehicle 105 may be a standard gasoline powered vehicle, a hybrid vehicle, an electric vehicle, a fuel cell vehicle, and/or any other mobility implement type of vehicle. The vehicle 105 includes parts related to mobility, such as a powertrain with an engine, a transmission, a suspension, a driveshaft, and/or wheels, etc. The vehicle 105 may be a manually controlled vehicle, semi-autonomous vehicle (e.g., some routine motive functions, such as parking, are controlled by the vehicle 105), or an autonomous vehicle (e.g., motive functions are controlled by the vehicle 105 without direct driver input). In this illustrated example, the vehicle 105 includes a plurality of sensors 107, a plurality of speakers 109, an on-board computing platform 111, and an on-board communications platform 113.

The autonomous level of a vehicle can be a Level 0 autonomous level that corresponds to no automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. In one embodiment, the UE 101 may be integrated in the vehicle 105, which may include assisted driving vehicles such as autonomous vehicles, highly assisted driving (HAD), and advanced driving assistance systems (ADAS). Any of these assisted driving systems may be incorporated into the UE 101. Alternatively, an assisted driving device (not illustrated) may be included in the vehicle 105. The assisted driving device may include memory, a processor, and systems to communicate with the UE 101.

The term autonomous vehicle may refer to a self-driving or driverless mode in which no passengers are required to be on board to operate the vehicle. An autonomous vehicle may be referred as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate and respond to lane marking indicators (lane marking type, lane marking intensity, lane marking color, lane marking offset, lane marking width, or other characteristics) and driving commands or navigation commands.

In one embodiment, the vehicle 105 may be an HAD vehicle or an ADAS vehicle. An HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In the illustrated embodiment, the sensors 107 may include image sensors (e.g., electronic imaging devices of both analog and digital types, which include digital cameras, camera modules, camera phones, thermal imaging devices, radar, sonar, lidar, etc.), a global positioning sensor for gathering location data, a signal detection sensor for detecting wireless signals or receivers for different short-range communications (e.g., Bluetooth, Wi-Fi, Li-Fi, near field communication (NFC), etc.), temporal information sensors, audio recorders for converting sound to sound data, velocity sensors, light sensors, oriental sensors augmented with height sensor and acceleration sensor, tilt sensors to detect the degree of incline or decline of the vehicle 105 along a path of travel, etc. In a further embodiment, sensors about the perimeter of the vehicle 105 may detect the relative distance of the vehicle 105 from other vehicles, establishments, stationary sensory devices within an area, road objects (e.g., road markings), lanes, or roadways, pedestrians, traffic lights, road features (e.g., curves) and any other objects, or a combination thereof. In one embodiment, the vehicle 105 may include GPS receivers to obtain geographic coordinates from satellites 129 for determining current location and time associated with the vehicle 105. Further, the location can be determined by a triangulation system such as A-GPS, Cell of Origin, or other location extrapolation technologies. One or more of the sensors 107 may be installed on the exterior surface or external components of the vehicle 105, within the interior cabin of the vehicle 105, between the interior cabin and the exterior surface of the vehicle 105, or a combination thereof. In one embodiment, one or more audio recorders of the sensors 107 may be mounted on an external surface of the vehicle 105, thereby enabling sound to be captured from the outside of the vehicle 105 (will be referred as an "exterior audio recorder," herein). A plurality of exterior audio recorders may be evenly disposed on the external surface of the vehicle 105 and enable the vehicle 105 to determine a general direction at which the vehicle 105 receives sound from an external environment. In one embodiment, one or more audio recorders of the sensors 107 may be disposed within a vehicle cabin (will be referred as an "interior audio recorder," herein). In one embodiment, one or more image sensors may be mounted on an external surface of the vehicle 105 (will be referred as an "exterior image sensor," herein) and used to identify a sound generating source and a location thereof. In such embodiment, image processing may be used to identify the location of the sound generating source from images captured by the one or more exterior image sensors. Such image processing may be performed by a machine learning model that uses historical data including images of sound generating sources captured at past instances of which the sound generating sources were generating sound. In one embodiment, an image sensor may be installed within a vehicle cabin (will be referred as an "interior image sensor," herein) for tracking an eyesight angle and a location of an occupant's head. In such embodiment, an FOV of a vehicle occupant may be determined based on the eyesight angle and a line of sight of the occupant. The line of sight may be a predetermined distance resembling an average distance at which human eyes are capable of detecting an object.

The speakers 109 may be electroacoustic transducers, such as dynamic speakers. One or more of the plurality of speakers 109 may be installed within a cabin of the vehicle 105 (will be referred as an "interior speaker," herein). The one or more interior speakers and one or more exterior audio recorders may enable sound to be captured from an external environment and provided within the vehicle cabin. Hereinafter, the combination one or more interior speakers, one or more exterior audio recorders, and computing devices (e.g., processor and memory within the vehicle 105) will be referred as a hear-through device, and a feature of replicating sound received at one or more exterior audio recorders within a vehicle cabin via one or more interior speaker will be referred as a hear-through feature. In one embodiment, sound recorded by one or more exterior audio recorders may correspond to sound output by one or more interior speakers. As such, the sound attribute of the recorded sound also corresponds to the sound attribute of the output sound, thereby assisting a passenger within the vehicle 105 to determine a direction at which sound was generated even when the vehicle cabin is physically isolated from the external environment. By way of example, exterior audio recorders that directly receive sound from one end of the vehicle 105 may cause a first subset of interior speakers positioned proximate to the one end to generate the sound at a greater amplitude than a second subset of interior speakers positioned proximate to an opposing end. In one embodiment, one or more of the plurality of speakers 109 may be installed on an external surface of the vehicle 105 (will be referred as an "exterior speaker," herein), thereby enabling sound generated within the vehicle cabin to be output outside the vehicle 105 even when the vehicle 105 is physically isolated from the external environment. In such embodiment, sound recorded by one or more audio recorders within the vehicle cabin may correspond to sound output by one or more exterior speakers 109. In one embodiment, one or more of the plurality of speakers 109 may be a hybrid speaker that functions as both a vehicle horn and an exterior speaker. It should be appreciated that a feature of receiving sound at one or more interior audio recorders and outputting the sound at one or more exterior speakers and/or one or more hybrid speakers will also be referred herein as the hear-through feature.

The on-board computing platform 111 performs one or more functions associated with the vehicle 105. In one embodiment, the on-board computing platform 111 may aggregate sensor data generated by at least one of the sensors 107 and transmit the sensor data via the on-board communications platform 113. The on-board computing platform 111 may receive control signals and/or other signals for performing one or more of the functions associated with the audio-based mapping platform 125, the UE 101, the services platform 117, one or more of the content providers 121a-121n, or a combination thereof via the on-board communications platform 113. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 113 includes wired or wireless network interfaces to enable communication with external networks. The on-board communications platform 113 also includes hardware (e.g., processors, memory, storage, antenna, etc.) and software to control the wired or wireless network interfaces. In the illustrated example, the on-board communications platform 113 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); NFC; local area wireless network (including IEEE 802.11 a/b/g/n/ac or others), dedicated short range communication (DSRC), and Wireless Gigabit (IEEE 802.11ad), etc.). In some examples, the on-board communications platform 113 includes a wired or wireless interface (e.g., an auxiliary port, a Universal Serial Bus (USB) port, a Bluetooth® wireless node, etc.) to communicatively couple with the UE 101.

The detection entity 115 may be equipped with one or more audio recorders capable of recording sound within a predetermined distance from the detection entity 115 and generating sound data associated with the recorded sound. The detection entity 115 may be further equipped with a communication interface (i.e., wired or wireless communication means) for providing the sound data to the audio-based mapping platform 125. By way of example, the detection entity 115 may be one or more other UEs (e.g., having similar capabilities as the UE 101), one or more other vehicles (e.g., having similar capabilities as the vehicle 105), one or more stationary devices equipped with sound capturing devices, or a combination thereof. In one embodiment, the detection entity 115 may provide contextual information indicating a time and location at which the detection entity 115 has captured sound. In one embodiment, the contextual information may further indicate a duration of which the detection entity 115 has captured sound. In one embodiment, the detection entity 115 may derive the contextual information and transmit the same to the audio-based mapping platform 125 over the communication network 123.

The services platform 117 may be an original equipment manufacturer (OEM) platform that provides one or more services 119a-119n (collectively referred to as services 119). In one embodiment, the one or more services 119 may be sensor data collection services. By way of example, vehicle sensor data provided by the sensors 107 may be transferred to the UE 101, the audio-based mapping platform 125, the database 127, or other entities communicatively coupled to the communication network 123 through the services platform 117. By way of example, the services platform 117 may also be other third-party services and include mapping services, navigation services, travel planning services, notification services, social networking services, content (e.g., audio, video, images, etc.) provisioning services, application services, storage services, contextual information determination services, weather-based services, location-based services, information-based services, etc. In one embodiment, the services platform 117 uses the output data generated by of the audio-based mapping platform 125 to provide services such as navigation, mapping, other location-based services, etc.

In one embodiment, the content providers 121a-121n (collectively referred to as content providers 121) may provide content or data (e.g., including geographic data, parametric representations of mapped features, etc.) to the UE 101, the vehicle 105, services platform 117, the audio-based mapping platform 125, the database 127, or the combination thereof. The content provided may be any type of content, such as map content, textual content, audio content, video content, image content, etc. In one embodiment, the content providers 121 may provide content that may aid in collecting or generating sound events, or other related characteristics. In one embodiment, the content providers 121 may also store content associated with the UE 101, the vehicle 105, detection entity 115, services platform 117, the audio-based mapping platform 125, the database 127, or the combination thereof. In another embodiment, the content providers 121 may manage access to a central repository of data, and offer a consistent, standard interface to data, such as a repository of the database 127.

The communication network 123 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the audio-based mapping platform 125 may be a platform with multiple interconnected components. The audio-based mapping platform 125 may include multiple servers, intelligent networking devices, computing devices, components and corresponding software for providing a map layer of one or more sound events. It should be appreciated that that the audio-based mapping platform 125 may be a separate entity of the system 100, included within the UE 101 (e.g., as part of the applications 103), included within the vehicle 105 (e.g., as part of an application stored in memory of the on-board computing platform 111), included within the services platform 117 (e.g., as part of an application stored in server memory for the services platform 117), included within the content providers 121 (e.g., as part of an application stored in server memory for the content providers 121), or a combination thereof.

The audio-based mapping platform 125 is capable of: (1) acquiring sound data captured by one or more detection entities 115; (2) classifying the sound data as one or more sound events; and (3) generating or updating a map layer by associating the one or more sound events to one or more road segments within the map layer. The sound data may correspond to raw sensor data acquired by one or more sound capturing devices (e.g., audio recorders equipped by vehicles, mobile device, etc.). In one embodiment, the one or more detection entities 115 may provide to the audio-based mapping platform 125 contextual information indicating a location and time at which the sound data was acquired by the one or more sound capturing devices. Alternatively, the audio-based mapping platform 125 may derive the contextual information by identifying a location of a sound capturing device that has provided the sound data and determining a time at which the sound data was provided to the audio-based mapping platform 125. The audio-based mapping platform 125 may classify acquired sound data as one or more sound events recorded in the database 127 if one or more sound attributes (e.g., wavelength, amplitude, frequency, time period, velocity, etc.) of at least a portion of the sound data corresponds to one or more sound attributes that defines, at least in part, the one or more sound events. In one embodiment, sound data from a detection entity 115 may not correspond to any sound event recorded in the database 127. In such embodiment, the audio-based mapping platform 125 may acquire other sound data provided from one or more other detection entities 115 that are within a predetermined distance from the detection entity 115 (will be referred as "proximate sound data," herein) and determine whether the other sound data correspond to one or more sound events recorded in the database 127. In one embodiment, proximate sound data provided from multiple detection entities 115 may be aggregated, and the aggregated proximate sound data may be compared to one or more sound events recorded in the database 127. For the map layer, the audio-based mapping platform 125 may label a road segment as being associated with a sound event when a detection entity 115 that is within or proximate to the road segment: (1) is currently capturing sound data that are classified as the sound event in real time; (2) has captured the sound data for a number of instances within a predetermined period; (3) has captured the sound data for a duration within the predetermined period. The predetermined period may be a fixed amount of period that terminates at real-time. As such, the starting time for the predetermined period dynamically changes over time. In one embodiment, if a detection entity 115 that is within or proximate to the road segment fails to: (1) capture sound data that are classified as the sound event in real time; (2) capture the sound data for a number of instances within the predetermined period; or (3) capture the sound data for a duration within the predetermined period, the audio-based mapping platform 125 may disassociate the road segment from the sound event. In one embodiment, the audio-based mapping platform 125 may use historical data associated with a given road segment of the map layer to generate a likelihood of which a sound event associated with the road segment will occur at or proximate to the road segment at one or more instances of time. By way of example, a machine learning model may be trained to predict whether the sound event will occur at the road segment at a time of which the vehicle 105 arrives at the road segment. In such example, the machine learning model may be trained by using historical data that indicates a frequency at which the sound event has occurred at the time over a plurality of days. If such frequency exceeds a threshold value, the machine learning model may output a "high" level of likelihood for the sound event to occur at the road segment at the time; whereas, if the frequency does not exceed the threshold value, the machine learning model may output a "low" level of likelihood for the sound event to occur at the time. Accordingly, a road segment having a "high" level of likelihood for the sound event to occur at the time may be defined by the audio-based mapping platform 125 as the road segment associated with the sound event for that time; whereas, a road segment having a "low" level of likelihood for the sound event to occur therein at the time may be defined by the audio-based mapping platform 125 as the road segment disassociated with the sound event for that time.

In one embodiment, the audio-based mapping platform 125 may output the map layer or a portion thereof to the UE 101. In one embodiment, the audio-based mapping platform 125 may generate a route based on the map layer and a user preference data associated with sound. In such embodiment, the user preference data may indicate a type of sound that a user prefers to hear. The type of sound may be sound generated by a type of vehicle (e.g., emergency vehicles, sports cars, ice cream truck, etc.), a type of music (e.g., by specific categories or specific artists), a type of animal (e.g., birds, animals, etc.), a type of human voice (e.g., male, female, children, a specific person's voice, etc.), or other types of sound generating sources (e.g., a construction work, a railroad crossing alarm, crowd noises from a stadium, an announcer's voice, intersections having Accessible Pedestrian Signals (APS), etc.). In one embodiment, the user preference data may indicate a specific sound attribute such as wavelength, amplitude, frequency, time period, or velocity of a sound wave. The user preference data may further indicate whether a user prefers to encounter or avoid one or more locations associated with one or more sound events including the type of sound and/or sound attribute. Based on the user preference data, the audio-based mapping platform 125 identifies one or more sound events within the map layer and generates a route that includes or avoids one or more road segments associated with the one or more sound events. The generated route may be provided to the UE 101 or used as navigation information/driving commands for the vehicle 105. In one embodiment, the user preference data may indicate that a user wishes to selectively hear sound output from one or more sound generating sources that is within a line of sight for the user. In one embodiment, the user preference data may indicate that a user wishes to hear sound output from one or more sound generating sources that is within the FOV of the user. In one embodiment, the user preference data may indicate that user wishes to hear sound output from one or more sound generating sources having certain visual attributes associated thereto. In one embodiment, the user preference data may indicate that user wishes to hear sound output from one or more sound generating sources that is associated with a point of interest (POI) (e.g., a valet for a hotel or a restaurant) and/or is within a location including the POI.

In one embodiment, the audio-based mapping platform 125 may track a location of the vehicle 105 with respect to the map layer. Once the vehicle 105 is within or proximate to a road segment associated with a sound event that is preferred by a user (will be referred as a "user-preferred road segment," herein), the audio-based mapping platform 125 may cause the vehicle 105 to: (1) expose a portion of a vehicle cabin to an external environment (e.g., causing a vehicle window to be lowered or causing a top of a convertible vehicle to be exposed); (2) provide a hear-through feature; (3) slow down; (4) maneuver to a proximate location where the vehicle 105 can park; or (5) a combination thereof. Alternatively, once the vehicle 105 is within or proximate to a user-preferred road segment, the audio-based mapping platform 125 may cause the UE 101 to generate a recommendation for a user to allow the vehicle 105 to perform one or more of the aforementioned features. In one embodiment, once the vehicle 105 is within or proximate to a user-preferred road segment, the audio-based mapping platform 125 may record sound generated from the exterior of the vehicle 105 and selectively provide sound within the vehicle cabin. By way of example, a plurality of sound generating sources outside the vehicle 105 may provide sound, and the audio-based mapping platform 125 may analyse the sound and only enable sound preferred by a user to be selectively provided within the vehicle cabin. In one embodiment, the sound preferred by a user may be modified through filters and/or amplifiers to improve clarity. In one embodiment, once the vehicle 105 is within or proximate to a user-preferred road segment, the audio-based mapping platform 125 may cause the vehicle 105 to selectively provide sound within the vehicle cabin such that only the sound generated by one or more sound generating sources that is within an FOV of a vehicle occupant is provided within the vehicle cabin. In one embodiment, once the vehicle 105 is within a user-preferred road segment, the audio-based mapping platform 125 may cause an HUD within the vehicle 105 to emphasize a location of a sound generating source based on an eye angle of an occupant of the vehicle 105, a head location/orientation of the occupant, and the location of the sound generating source. Details of such embodiment will be further described with respect to FIG. 6.

In one embodiment, the audio-based mapping platform 125 may cause the vehicle 105 to provide the hear-through feature or expose a portion of the vehicle cabin to an external environment when the vehicle 105 is within or proximate to a road segment associated with a POI. By way of example, the audio-based mapping platform 125 may determine that the vehicle 105 arrives at a hotel that provides a valet service. In response, the audio-based mapping platform 125 cause the vehicle 105 to identify a valet proximate to the vehicle 105. Such identification may be based on: (1) identifying a person approaching the vehicle 105; (2) identifying biometric attributes of a person; (3) identifying non-biometric attributes of a person; or (4) a combination thereof. Once a person is detected as a valet, the audio-based mapping platform 125 may cause the vehicle 105 to allow the valet to participate in the hear-through feature.

In the illustrated embodiment, the database 127 stores information on road links (e.g., road signs associated with road links, road length, road breadth, slope information, curvature information, etc.) and probe data for one or more road links (e.g., traffic density information). In one embodiment, the database 127 may include any multiple types of information that can provide means for aiding in classifying sound events, providing and/or updating a map layer based on the classified sound events, and providing a route using the map layer. It should be appreciated that the information stored in the database 127 may be acquired from any of the elements within the system 100, other vehicles, sensors, database, or a combination thereof.

In one embodiment, the UE 101, the vehicle 105, the detection entity 115, the services platform 117, the content providers 121, and the audio-based mapping platform 125 communicate with each other via the communication network 123 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises: (1) header information associated with a particular protocol; and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
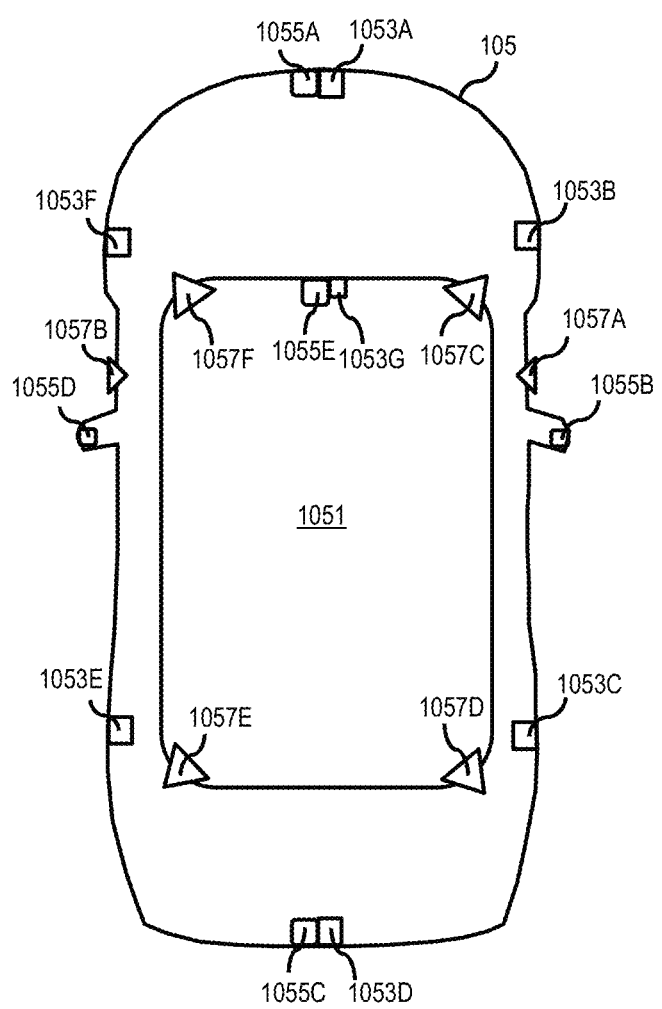
FIG. 1B illustrates locations of a plurality of sensors and speakers with respect to an exterior of the vehicle of FIG. 1A and a cabin of the vehicle.
Figure 1C:
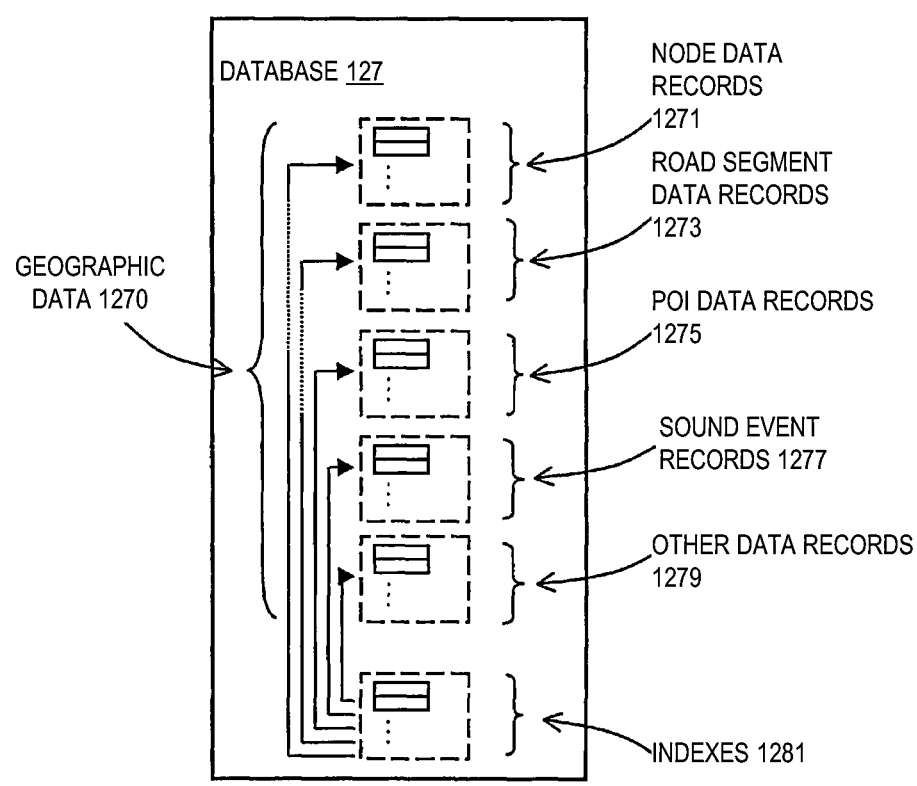

FIG. 1B illustrates locations of a plurality of sensors and speakers with respect to an exterior of the vehicle 105 and a cabin of the vehicle 105, according to one embodiment. In the illustrated embodiment, a plurality of exterior audio recorders 1053A, 1053B, 1053C, 1053D, 1053E, and 1053F, a plurality of exterior image sensors 1055A, 1055B, 1055C, and 1055D, and a plurality of speakers 1057A and 1057B are disposed on the exterior of the vehicle 105. The plurality of exterior audio recorders 1053A, 1053B, 1053C, 1053D, 1053E, and 1053F and the plurality of exterior image sensors 1055A, 1055B, 1055C, and 1055D are generally positioned around the exterior of the vehicle 105, thereby enabling the vehicle 105 to record external sound and capture images at a plurality of different directions with respect to the vehicle 105. The plurality of exterior speakers 1057A and 1057B are advantageously disposed at the exterior of the vehicle 105 proximate to front left and right vehicle doors, thereby enabling sound to be directly output to a sound receiving source, such as a valet, a drive-through machine, a drive-through worker, etc. A vehicle cabin 1051 includes an interior audio recorder 1053G, an interior image sensor 1055E, and a plurality of interior speakers 1057C, 1057D, 1057E, and 1057F. The plurality of interior speakers 1057C, 1057D, 1057E, and 1057F may be positioned around the interior of the vehicle 105, thereby assisting an occupant within the vehicle cabin 1051 to determine a direction at which the vehicle 105 receives external sound. In one embodiment, the plurality of exterior audio recorders 1053A, 1053B, 1053C, 1053D, 1053E, and 1053F and the plurality of interior speakers 1057C, 1057D, 1057E, and 1057F may be used by the vehicle 105 to enable an occupant within the vehicle cabin 1051 to determine a direction at which the vehicle 105 receives sound. By way of example, if a sound generating source outside the vehicle 105 is proximate to the exterior audio recorder 1053F and generates sound, the interior speaker 1057F may replicate the sound at a volume corresponding to the sound recorded by the exterior audio recorder 1053F; whereas, the sound generated by the interior speaker 1057D may be negligible to an occupant within the vehicle cabin 1051. In one embodiment, the vehicle 105 may acquire sound generated within the vehicle cabin 1051 via the interior audio recorder 1053G and output the sound via the exterior speakers 1057A and/or 1057B. In one embodiment, the vehicle 105 may use the plurality of exterior image sensors 1055A, 1055B, 1055C, and 1055D to identify a location of a sound generating source. In one embodiment, the vehicle 105 may: (1) identify a sound generating source using one or more of the plurality of exterior image sensors 1055A, 1055B, 1055C, and 1055D; (2) use the interior image sensor 1055E track an eye angle of an occupant; (3) determine an FOV of the occupant; (4) determine whether the sound generating source is within the FOV of the occupant; and (5) if the sound generating source is within the FOV of the occupant, selectively enable one or more of the plurality interior speakers 1057C, 1057D, 1057E, and 1057F to generate sound corresponding to sound generated by the sound generating source. Additional or a plurality of mentioned components may be provided within the vehicle 105.

Figure 10:
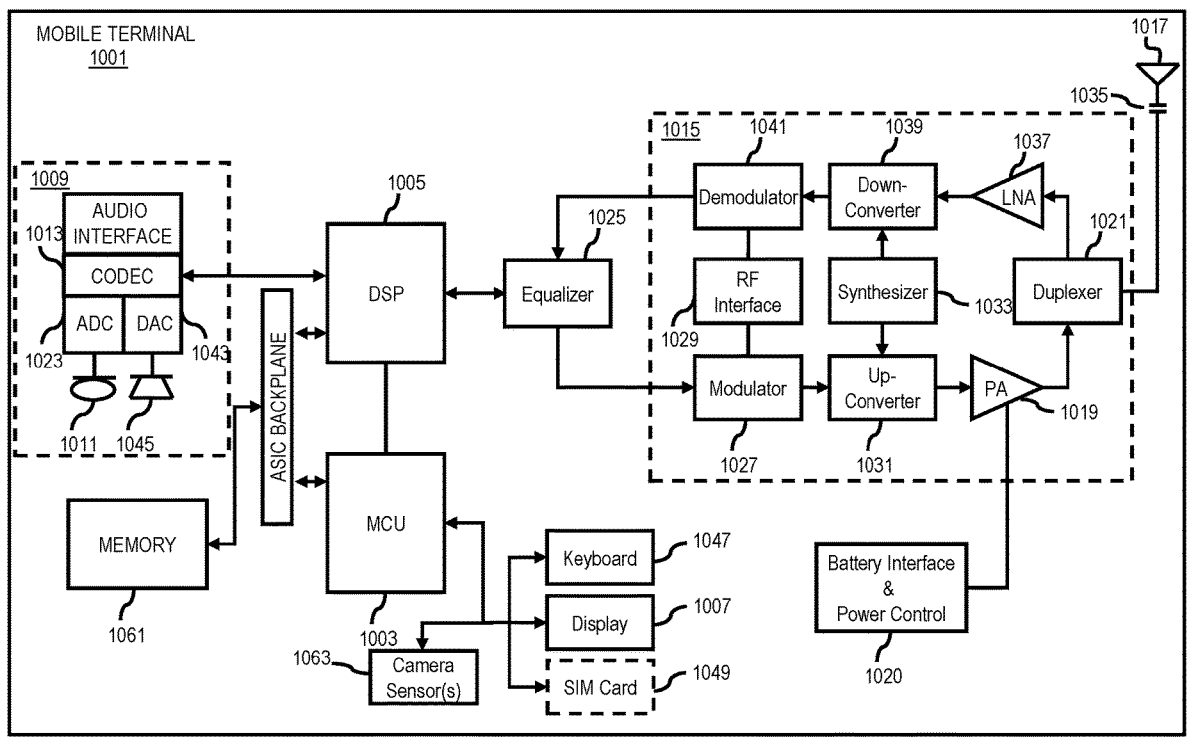
FIG. 10 illustrates a diagram of the database within the system of FIG. 1A.

FIG. 10 is a diagram of a database 127 (e.g., a map or geographic database), according to one embodiment. In one embodiment, the database 127 includes geographic data 1270 used for (or configured to be compiled to be used for) mapping and/or navigation-related services. In one embodiment, the following terminology applies to the representation of geographic features in the database 127.

a. "Node"—A point that terminates a link.
   b. "Line segment"—A straight line connecting two points.
   c. "Link" (or "edge")—A contiguous, non-branching string of one or more line segments terminating in a node at each end.

In one embodiment, the database 127 follows certain conventions. For example, links do not cross themselves and do not cross each other except at a node. Also, there are no duplicated shape points, nodes, or links. Two links that connect each other have a common node.

As shown, the database 127 includes node data records 1271, road segment or link data records 1273, POI data records 1275, sound event records 1277, other records 1279, and indexes 1281, for example. More, fewer or different data records can be provided. In one embodiment, additional data records (not shown) can include cartographic ("carto") data records, routing data, and maneuver data. In one embodiment, the indexes 1281 may improve the speed of data retrieval operations in the database 127. In one embodiment, the indexes 1281 may be used to quickly locate data without having to search every row in the database 127 every time it is accessed.

In exemplary embodiments, the road segment data records 1273 are links or segments representing roads, streets, or paths, as can be used in the calculated route or recorded route information for determination of one or more personalized routes. The node data records 1271 are end points (such as intersections) corresponding to the respective links or segments of the road segment data records 1273. The road link data records 1273 and the node data records 1271 represent a road network, such as used by vehicles, cars, and/or other entities. Alternatively, the database 127 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, presence of a construction work site, and other navigation related attributes, as well as POIs, such as gasoline stations, hotels, restaurants, museums, stadiums, offices, automobile dealerships, auto repair shops, stores, other buildings, parks, tunnels, etc. The database 127 can include data about the POIs and their respective locations in the POI data records 1275. The data about the POIs may include attribute data associated with the POIs such as a type of POI, a shape of POI, a dimension(s) of POI, a number of stories included in each of the POIs, one or more types of services provided by a POI, etc. The database 127 can also include data about places, such as cities, towns, or other communities, and other geographic features, such as bodies of water, mountain ranges, etc. Such place or feature data can be part of the POI data records 1275 or can be associated with POIs or POI data records 1275 (such as a data point used for displaying or representing a position of a city).

In one embodiment, the database 127 includes sound event records 1277. The sound event records 1277 may indicate sound generated by a type of vehicle (e.g., emergency vehicles, sports cars, ice cream truck, etc.), a type of music (e.g., by specific categories or specific artists), a type of animal (e.g., birds, chipmunk, etc.), a type of human voice (e.g., male, female, children, a specific person's voice, etc.), or other types of sound generating sources (e.g., a construction work, a railroad crossing alarm, crowd noises from a stadium, an announcer's voice, intersections having Accessible Pedestrian Signals (APS), etc.). Each of the sound event may be defined by a unique sound signature. The sound event records 1277 may indicate a detection entity 115 that has provided sound data, a location of the detection entity 115, and a time at which the detection entity 115 provided the sound data. The sound event records 1277 may include data that associates one or more road segments of a map layer to one or more sound events. The sound event records 1277 may indicate a history of which one or more road segments of a map layer was associated and/or disassociated with one or more road segments.

Other records 1281 may include user preference data for one or more users. The user preference data may be integrated with a map layer such that one or more user-preferred road segments is distinguished from other road segments within the map layer. The other records 1281 may also embody a machine learning model for classifying sound data to one or more sound events. The machine learning model may be trained using a plurality of sound data samples and ground truth data. The ground truth data may indicate an actual event in which one or more sound generating sources has generated one or more types of sound. The other records 1281 may further embody machine learning models that analyse images to identify objects that generate sound.

In one embodiment, the database 127 can be maintained by one or more of the content providers 121 in association with a map developer. The map developer can collect geographic data 1270 to generate and enhance the database 127. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 127 can be a master database stored in a format that facilitates updating, maintenance, and development. For example, the master database or data in the master database can be in an Oracle spatial format or other spatial format (e.g., including different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for providing a map layer indicating sound events may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 2:
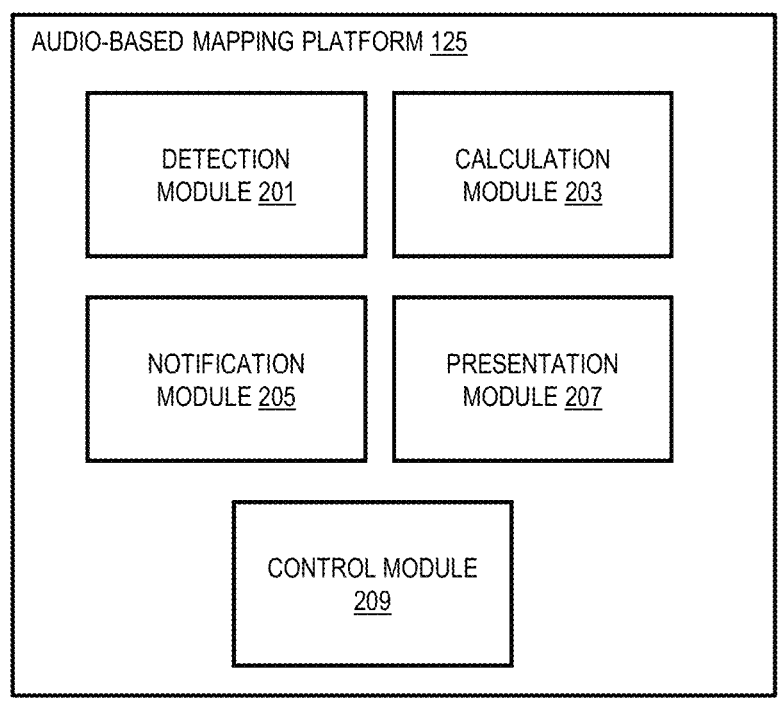
FIG. 2 illustrates a diagram of the components of the audio-based mapping platform of FIG. 1A.

FIG. 2 is a diagram of the components of the audio-based mapping platform 125, according to one embodiment. By way of example, the audio-based mapping platform 125 includes one or more components for providing a map layer of one or more sound events and using the map layer for generating a route. It is contemplated that the functions of these components may be combined in one or more components or performed by other components of equivalent functionality. In this embodiment, the audio-based mapping platform 125 includes a detection module 201, a calculation module 203, a notification module 205, a presentation module 207, and a control module 209.

The detection module 201 may acquire information and/or data for providing a map layer of one or more sound events. In one embodiment, the detection module 201 may acquire sound data from one or more detection entities 115. Additionally, the detection module 201 may acquire from the one or more detection entities 115 contextual information indicating a location and time of which the sound data was acquired by the one or more sound capturing devices. In one embodiment, the detection module 201 may acquire user preference data for at least one occupant of the vehicle 105 from the UE 101, the database 127, or a combination thereof. The user preference data may be acquired by the detection module 201 when a user provides an input via the UE 101 or the vehicle 105 that the user is within the vehicle 105, or the user preference data may be automatically acquired by the detection module 201 when the vehicle 105 detects via the sensors 107 attribute data associated with a user (e.g., biometric or non-biometric characteristics of the user). In one embodiment, the detection module 201 may determine a current road segment on which the vehicle 105 is traversing or a travel link of the vehicle 105. In one embodiment, the detection module 201 may acquire historical data associated with one or more road segments, where the historical data indicates, for each road segment, a frequency of which a sound event occurs at said road segment for one or more instances of time. In one embodiment, the detection module 201 may determine whether the vehicle 105 is within or proximate to a road segment associated with a POI.

The calculation module 203 may classify sound data provided by one or more detection entities 115 as one or more sound events recorded in the database 127. Specifically, the calculation module 203: (1) identifies one or more sound attributes (e.g., wavelength, amplitude, frequency, time period, velocity, etc.) of at least a portion of the sound data; (2) compares the one or more sound attribute to one or more sound attributes that defines, at least in part, the one or more sound events; and (3) classify the sound data as the one or more sound events in response to the one or more sound attribute of the at least one portion of the sound data corresponding to the one or more sound attributes that defines, at least in part, the one or more sound events. If the sound data acquired from a detection entity 115 does not correspond to any sound event recorded in the database 127, calculation module 203 may identify one or more other detection entities 115 that are within a predetermined distance from the detection entity 115 and acquire proximate sound data from the one or more other detection entities 115. If one other detection entity 115 provides proximate sound data that correspond to one or more sound events recorded in the database 127, the unknown sound data may be classified as the one or more sound events. If a plurality of other detection entities 115 provide proximate sound data, and most of the other plurality of detection entities 115 provide proximate sound data that correspond to one or more sound events recorded in the database 127, the unknown sound data may be classified as the one or more sound events. However, if more than half of the plurality of detection entities 115 do not provide proximate sound data that correspond to one or more sound events recorded in the database 127, the unknown sound data may remain unclassified. In one embodiment, the calculation module 203 may aggregate proximate sound data provided from a plurality of other detection entities 115 and compare the aggregated proximate sound data to one or more sound events recorded in the database 127. In one embodiment, the calculation module 203 may aggregate the unknown sound data and one or more proximate sound data provided from one or more other detection entities 115 and compare the aggregated proximate sound data to one or more sound events recorded in the database 127.

If sound data acquired by a detection entity 115 is classified as a sound event recorded in the database 127, the calculation module 203 may determine: (1) a location at which the detection entity 115 has captured the sound data; and (2) one or more road segments that are within a predetermined distance from the detection entity 115. For each of said road segment, the calculation module 203 may label said road segment as being associated with the sound event when the detection entity 115: (1) is currently capturing sound data that are classified as the sound event in real time; (2) has captured the sound data for a number of instances within a predetermined period; (3) has captured the sound data for a duration within the predetermined period. The predetermined period may be a fixed amount of period that terminates at real-time. As such, the starting time for the predetermined period dynamically changes over time. In one embodiment, if the calculation module 203 determines that the detection entity 115 that is within or proximate to the road segment fails to: (1) capture sound data that are classified as the sound event in real time; (2) capture the sound data for a number of instances within the predetermined period; or (3) capture the sound data for a duration within the predetermined period, the calculation module 203 may disassociate the road segment from the sound event. In one embodiment, the calculation module 203 may use historical data associated with a given road segment of the map layer to generate a likelihood of which a sound event associated with the road segment will occur at or proximate to the road segment at one or more instances of time. By way of example, a machine learning model may be trained to predict whether the sound event will occur at the road segment at a time of which the vehicle 105 arrives at the road segment. In such example, the machine learning model may be trained by using historical data that indicates a frequency at which the sound event has occurred at the time over a plurality of days. If such frequency exceeds a threshold value, the machine learning model may output a "high" level of likelihood for the sound event to occur at the road segment at the time; whereas, if the frequency does not exceed the threshold value, the machine learning model may output a "low" level of likelihood for the sound event to occur at the time. Accordingly, a road segment having a "high" level of likelihood for the sound event to occur therein at the time may be defined by the calculation module 203 as the road segment associated with the sound event for that time; whereas, a road segment having a "low" level of likelihood for the sound event to occur therein at the time may be defined by the calculation module 203 as the road segment disassociated with the sound event for that time. Based the way of which the calculation module 203 associates or disassociates a road segment to a sound event, as discussed above, the calculation module 203 generates or updates a map layer indicating sound events. In one embodiment, the calculation module 203 may generate a route for a user based on the map layer and user preference data of the user. Such route may encounter one or more road segments associated with one or more sound events, avoid one or more road segments associated with one or more sound events, or a combination thereof. In one embodiment, the calculation module 203 may use the map layer to determine whether a current road segment on which the vehicle 105 is traversing (and/or a subsequent road segment) is a user-preferred road segment. In one embodiment, the calculation module 203 may use the map layer to determine whether a travel link of the vehicle 105 includes one or more user-preferred road segments.

The notification module 205 may cause a notification to the UE 101 and/or other notification devices within the vehicle 105. In one embodiment, the notification may indicate: (1) the map layer or a portion thereof; (2) one or more sound events within the map layer or a portion thereof; (3) one or more user-preferred road segments within the map layer or a portion thereof; (4) whether a current road segment on which the vehicle 105 is traversing (and/or a subsequent road segment) is a user-preferred road segment; (5) whether a travel link of the vehicle 105 includes one or more user-preferred road segments; (6) whether one or more sound generating sources as indicated in the user preference data is detected within or proximate to a user-preferred road segment; (7) a direction at which the vehicle 105 is receiving sound from outside the vehicle 105; (8) a location of a sound generating source; (9) a function that will be performed by the vehicle 105 when the vehicle 105 is within or proximate to a user-preferred road segment; (10) a recommendation for the vehicle 105 to perform a function in response to being within or proximate to a user-preferred road segment; or (11) a combination thereof. The notification may be generated as a sound notification, display notification, vibration, or a combination thereof.

The presentation module 207 obtains a set of information, data, and/or calculated results from other modules, and continues with providing a presentation of a visual representation to the UE 101. The visual representation may indicate any of the information presented by the notification module 205. In one embodiment, the visual representation may be presented as a combination of map layers including the map layer of one or more sound events and other map layers indicating other information such as a degree of traffic, a type of weather affecting one or more road segments, accident locations, construction works, etc. In one embodiment, the map layer may include one or more elements that resembles states of any of said visual representations in real-time or future time.

In one embodiment, the control module 209 may provide commands for causing the vehicle 105 to perform a function in response to being proximate or within a user-preferred road segment. In one embodiment, the control module 209 may generate such commands based on the user preference data. In one embodiment, the command may cause the vehicle 105 to: (1) expose a portion of a vehicle cabin to an external environment (e.g., causing a vehicle window to be lowered or causing a top of a convertible vehicle to be exposed); (2) provide a hear-through feature; (3) slow down; (4) maneuver to a proximate location where the vehicle 105 can park; or (5) a combination thereof. In one embodiment, once the vehicle 105 is within or proximate to a user-preferred road segment, the control module 209 may record sound generated from the exterior of the vehicle 105 and selectively provide sound within the vehicle cabin. By way of example, a plurality of sound generating sources outside the vehicle 105 may provide sound, and the control module 209 may analyse the sound and only enable sound preferred by a user to be selectively provided within the vehicle cabin. In one embodiment, the sound preferred by a user may be modified through filters and/or amplifiers to improve clarity. In one embodiment, once the vehicle 105 is within or proximate to a user-preferred road segment, the control module 209 may cause the vehicle 105 to selectively provide sound within the vehicle cabin such that only the sound generated by one or more sound generating sources that is within a line of sight or an FOV of a vehicle occupant is provided within the cabin. In one embodiment, the control module 209 may cause the vehicle 105 to provide the hear-through feature or expose a portion of the vehicle cabin to an external environment when the vehicle 105 is within or proximate to a road segment associated with a POI. By way of example, the control module 209 may determine that the vehicle 105 arrives at a hotel that provides a valet service. In response, the control module 209 causes the vehicle 105 to identify a valet proximate to the vehicle 105. Such identification may be based on: (1) identifying a person approaching the vehicle 105; (2) identifying biometric attributes of a person; (3) identifying non-biometric attributes of a person; or (4) a combination thereof. Once a person is detected as a valet, the control module 209 may cause the vehicle 105 to allow the valet to participate in the hear-through feature. In one embodiment, once the vehicle 105 is within a user-preferred road segment, the control module 209 may cause an HUD within the vehicle 105 to emphasize a location of a sound generating source based on an eye angle of an occupant of the vehicle 105, a head location/orientation of the occupant, and the location of the sound generating source. Details of such embodiment will be further described with respect to FIG. 6.

The above presented modules and components of the audio-based mapping platform 125 can be implemented in hardware, firmware, software, or a combination thereof. Though depicted as a separate entity in FIG. 2, it is contemplated that the audio-based mapping platform 125 may be implemented for direct operation by the UE 101, the vehicle 105, the services platform 119, one or more of the content providers 121, or a combination thereof. As such, the audio-based mapping platform 125 may generate direct signal inputs by way of the operating system of the UE 101, the vehicle 105, the services platform 117, the one or more of the content providers 121, or the combination thereof for interacting with the applications 103. The various executions presented herein contemplate any and all arrangements and models.

Figure 3:
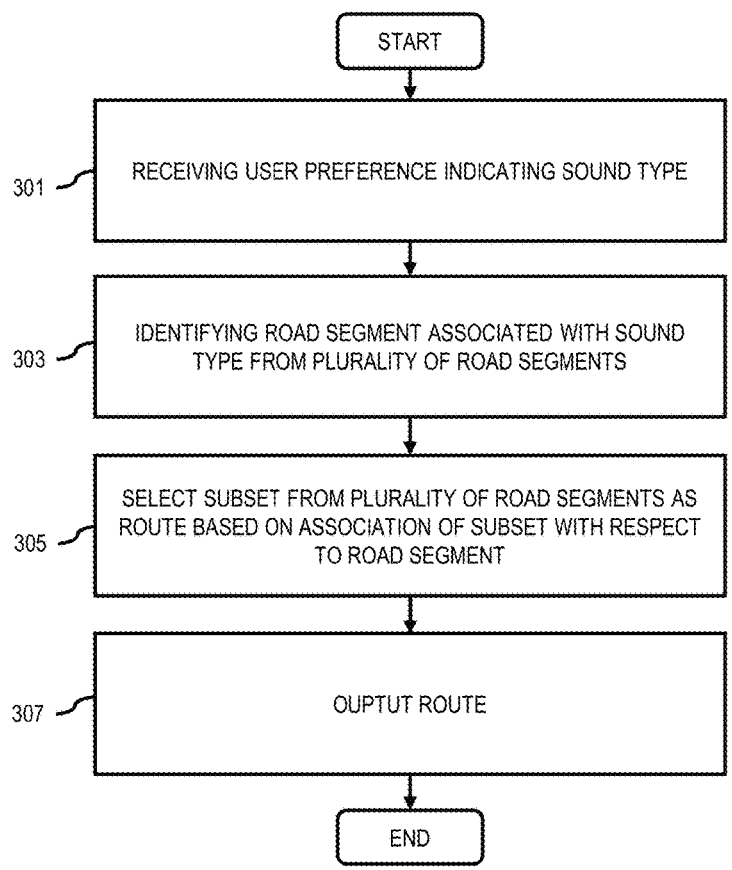
FIG. 3 illustrates a flowchart of a process for generating a route based on a user's sound preference.
Figure 9:
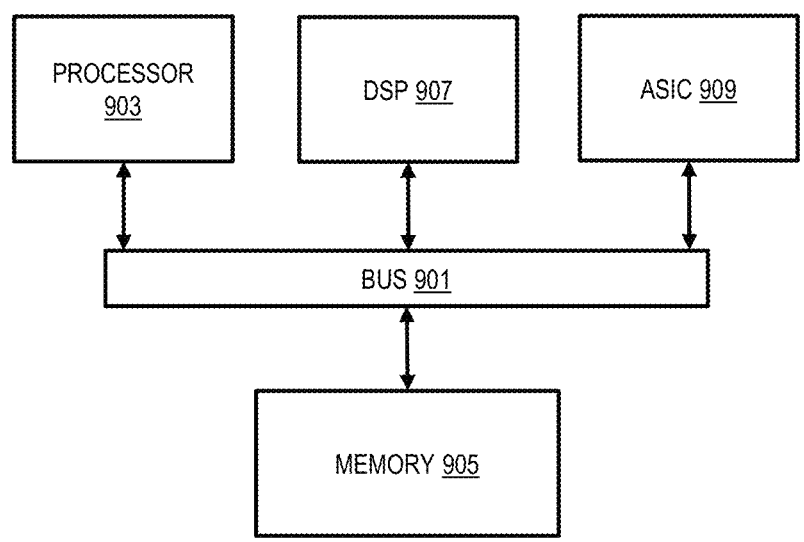
FIG. 9 illustrates a chip set or chip upon which an embodiment may be implemented.

FIG. 3 is a flowchart of a process 300 for generating a route based on a user preference indicating a sound type, according to one embodiment. In one embodiment, the audio-based mapping platform 125 performs the process 300 and is implemented in, for instance, a chip set including a processor and a memory as shown in FIG. 9.

In step 301, the audio-based mapping platform 125 receives a user preference indicating a sound type. Specifically, the audio-based mapping platform 125 may receive, from the UE 101, the vehicle 105, the database 127, or a combination thereof, user preference data. The user preference data may indicate that a user prefers a route that includes one or more road segments associated with a sound event that corresponds to the sound type. Alternatively, the user preference data may indicate that a user prefers a route that avoids one or more road segments associated with a sound event that corresponds to the sound type.

In step 303, the audio-based mapping platform 125 identifies a road segment associated with the sound type from a plurality of road segments. The plurality of road segments may be defined within a map layer that indicates one or more sound events, and one or more of the plurality of road segments may be associated with one or more sound events. The audio-based mapping platform 125 may label a road segment as being associated with a sound event when a detection entity 115 that is within or proximate to the road segment: (1) is currently capturing sound data that are classified as the sound event in real time; (2) has captured the sound data for a number of instances within a predetermined period; (3) has captured the sound data for a duration within the predetermined period. The predetermined period may be a fixed amount of period that terminates at real-time. As such, the starting time for the predetermined period dynamically changes over time. In one embodiment, the audio-based mapping platform 125 may label a road segment as being associated with a sound event for a given time when the road segment has a "high" level of likelihood for the sound event to occur at the road segment at the time. In step 303, the road segment associated with the sound type is a road segment associated with a sound event that corresponds to the sound type, as indicated in the user preference.

In step 305, the audio-based mapping platform 125 selects a subset from the plurality of road segments as a route based on association of the subset with respect to the road segment. The subset may be one or more of the plurality of road segments defined within the map layer. The subset may be a route that includes one or more road segments associated with a sound event that corresponds to the sound type. Alternatively, the subset may be a route that excludes one or more road segments associated with a sound event that corresponds to the sound type.

In step 307, the audio-based mapping platform 125 outputs the route. The output route may be provided to the UE 101, the vehicle 105, a device associated with the vehicle 105 or other device, or a combination thereof.

Figure 4:
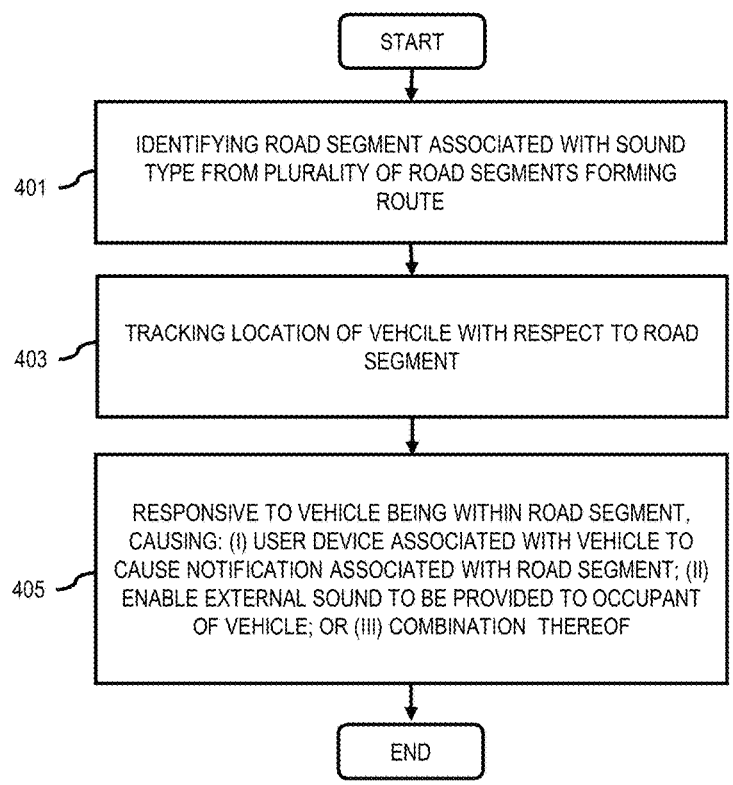
FIG. 4 illustrates a flowchart of a process for facilitating a vehicle occupant to hear a user-preferred sound event while a vehicle traverses a route.

FIG. 4 is a flowchart of a process 400 for facilitating a vehicle occupant to hear a user-preferred sound event while a vehicle traverses a route, according to one embodiment. In one embodiment, the audio-based mapping platform 125 performs the process 400 and is implemented in, for instance, a chip set including a processor and a memory as shown in FIG. 9.

In step 401, the audio-based mapping platform 125 identifies a road segment associated with a sound type from a plurality of road segments forming a route, where the sound type is selected based on a user preference. The road segment associated with the sound type may be a road segment associated with a sound event that corresponds to the sound type. The plurality of road segments may be defined within a map layer that indicates one or more sound events, and one or more of the plurality of road segments may be associated with one or more sound events. The audio-based mapping platform 125 may label a road segment as being associated with a sound event when a detection entity 115 that is within or proximate to the road segment: (1) is currently capturing sound data that are classified as the sound event in real time; (2) has captured the sound data for a number of instances within a predetermined period; or (3) has captured the sound data for a duration within the predetermined period. The predetermined period may be a fixed amount of period that terminates at real-time. As such, the starting time for the predetermined period dynamically changes over time. In one embodiment, the audio-based mapping platform 125 may label a road segment as being associated with a sound event for a given time when the road segment has a "high" level of likelihood for the sound event to occur at the road segment at the time.

In step 403, the audio-based mapping platform 125 tracks a location of the vehicle 105 with respect to the road segment. In one embodiment, the location of the vehicle 105 may be integrated within a map layer that includes the road segment, one or more other road segments associated with one or more other sound events, and one or more other road segments disassociated with any sound event. The map layer may be constantly updated such that association of one or more road segments to one or more sound events may dynamically change through time. As such, the audio-base mapping platform 125 may use the map layer to quickly inform a user whether the vehicle 105 is currently traversing or will traverse a road segment associated with a sound event corresponding to the sound type, as indicated in the user preference.

In step 405, the audio-based mapping platform 125 determine whether the vehicle 105 is within the road segment associated with the sound type. If the vehicle 105 is within the road segment associated with the sound type, the audio-based mapping platform 125 may cause: (i) a user device associated with the vehicle 105 (such as the UE 101) to cause a notification associated with the road segment (e.g., a notification indicating that the vehicle 105 has arrived at the road segment); (ii) enable sound outside the vehicle 105 to be provided to the occupant (e.g., the hear-through feature, opening a window, or causing a top of a convertible vehicle to be exposed); or (iii) a combination thereof.

Figure 5:
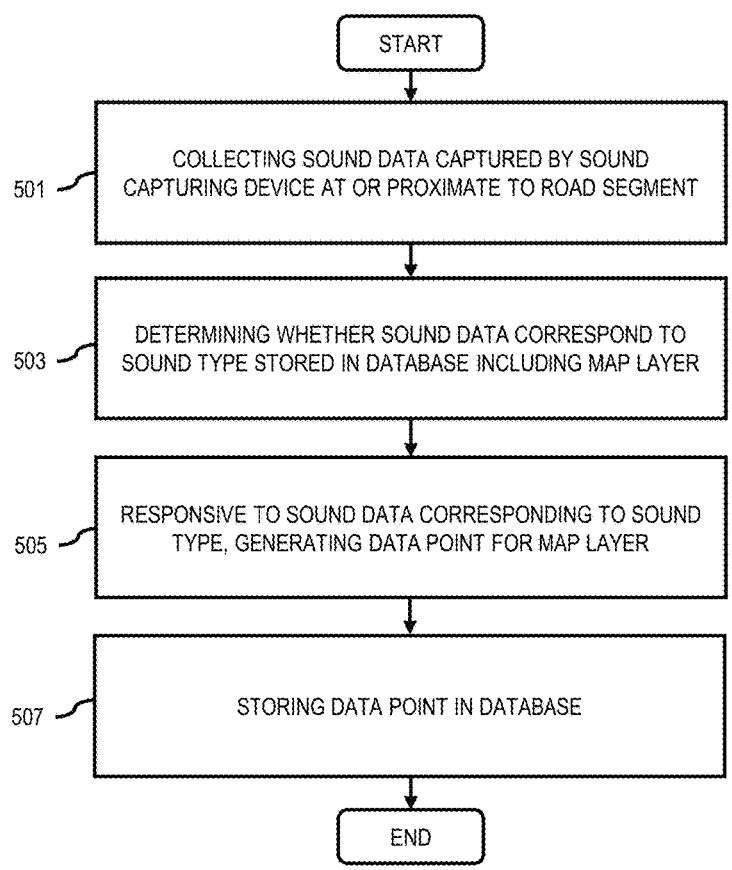
FIG. 5 illustrates a flowchart of a process for updating a map layer that associates one or more road segments to one or more sound events.

FIG. 5 is a flowchart of a process 500 for updating a map layer that associates one or more road segments to one or more sound events, according to one embodiment. In one embodiment, the audio-based mapping platform 125 performs the process 500 and is implemented in, for instance, a chip set including a processor and a memory as shown in FIG. 9.

In step 501, the audio-based mapping platform 125 collects sound data captured by a sound capturing device at or proximate to a road segment. The sound capturing device may be a detection entity 115. In one embodiment, the audio-based mapping platform 125 may further acquire contextual information indicating a time and location at which the sound capturing device has captured the sound data.

In step 503, the audio-based mapping platform 125 determines whether the sound data correspond to a sound type stored in the database 127. The audio-based mapping platform 125 determines that the sound data correspond to the sound type stored in the database 127 if one or more sound attributes (e.g., wavelength, amplitude, frequency, time period, velocity, etc.) of at least a portion of the sound data corresponds to one or more sound attributes that defines, at least in part, the sound type stored in the database 127.

In step 505, if the sound data correspond to a sound type stored in the database 127, the audio-based mapping platform 125 generates a data point for the map layer, where the data point associates the sound type to the road segment. In one embodiment, the audio-based mapping platform 125 may maintain the data point when: (1) the sound capturing device or another sound capturing device at or proximate to the road segment is currently capturing the sound data; (2) has captured the sound data for a number of instances within a predetermined period; or (3) has captured the sound data for a duration within the predetermined period. Otherwise, the audio-based mapping platform 125 may omit the data point.

In step 507, the audio-based mapping platform 125 stores the data point in the database 127. The map layer may include the data point and one or more other data points that associate the sound type or one or more other sound types to one or more other road segments. Since the map layer is constantly updated to associate or disassociate one or more road segments to one or more sound types, the audio-based mapping platform 125 may generate a route using the map layer such that the route includes or excludes one or more road segments associated with one or more sound types.

Figure 6:
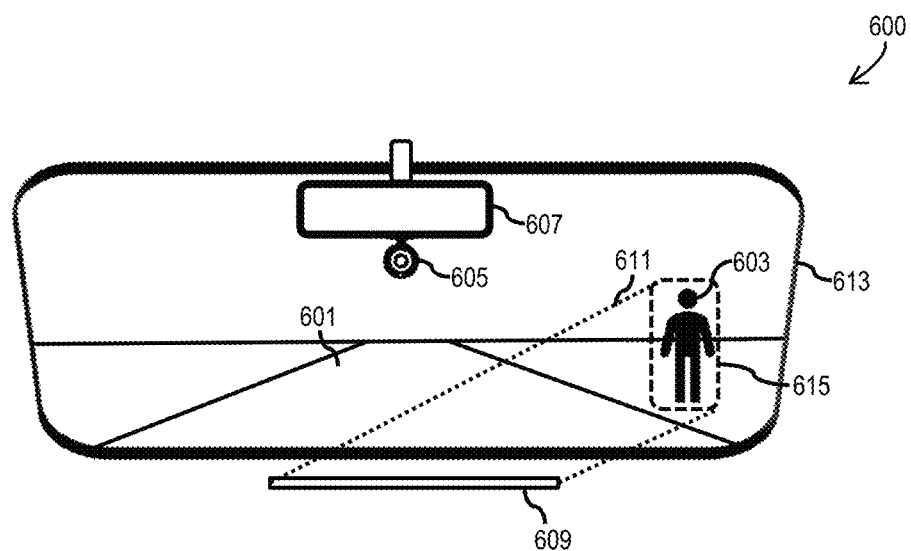
FIG. 6 illustrates an example view within a cabin of the vehicle and a head-up display (HUD) emphasizing a location of a sound generating source.

FIG. 6 illustrates an example view 600 within a cabin of the vehicle 105 and an HUD emphasizing a location of a sound generating source. In the illustrated embodiment, the audio-based mapping platform 125 is aware that the vehicle 105 is traversing a user-preferred road segment 601 and in response, has caused an exterior image sensor (not illustrated) to identify a sound generating source 603. Additionally, an interior image sensor 605 is mounted on a rear-view mirror 607, and the vehicle 105 has used the interior image sensor 605 to determine an eye angle and a head location/orientation of an occupant within a cabin of the vehicle 105. Based on the eye angle, the head location/orientation, and the location of the sound generating source 603, the vehicle 105 has caused an HUD device 609 to project a light beam 611 on a portion of a front-facing window 613, thereby rendering a highlighted outline 615 that emphasizes the location of the sound generating source 603 with respect to a field of vision of the occupant and enabling the occupant to easily identify the sound generating source 603 as the vehicle 105 traverse the user-preferred road segment 601.

Figure 7:
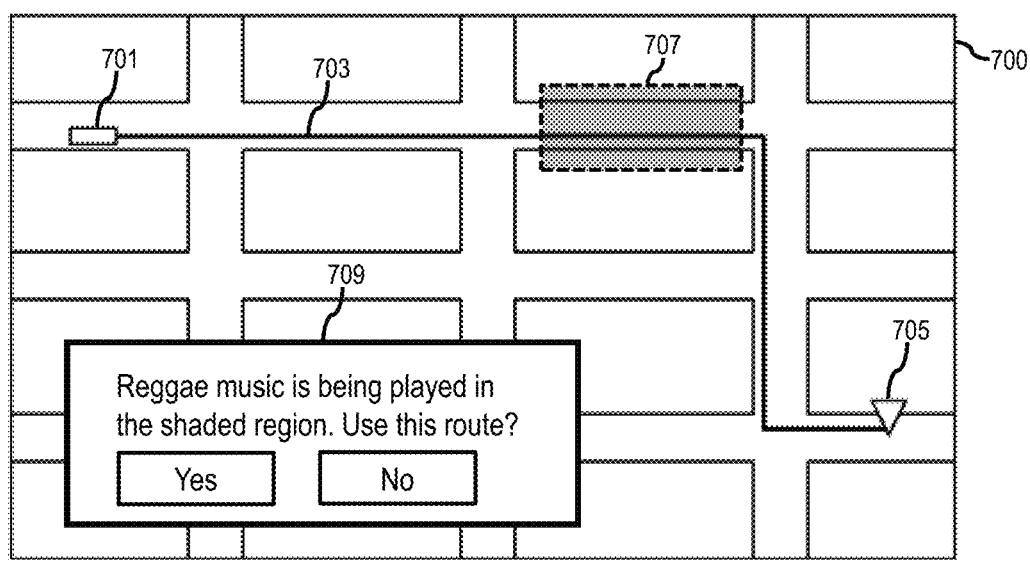
FIG. 7 illustrates an example display illustrating a route including a user-preferred road segment.

FIG. 7 is an example display illustrating a route including a user-preferred road segment. The example display may be displayed via the UE 101. In the illustrated embodiment, the example display illustrates a map 700 including a vehicle model 701 representing a current location of the vehicle 105, a route 703 to a destination 705, a shaded region 707, and a prompt message 709. In such embodiment, the audio-based mapping platform 125 has identified a user preference with regards to a type of sound that the user wants to hear. In this example, the user preference may indicate that a user wishes to encounter a location where a reggae music is being played. Using a map layer of one or more sound events, the audio-based mapping platform 125 has identified the shaded region 707 as a user-preferred road segment (e.g., a location where a reggae music is currently being played) and generated the route 703 as a recommendation for the user. Accordingly, the prompt message 709 states "REGGAE MUSIC IS BEING PLAYED IN THE SHADED REGION. USE THIS ROUTE?" In alternative embodiments, as the vehicle 105 traverses a route, the example display may generate one or more shaded regions within the route to notify a user that the vehicle 105 will approach one or more user-preferred road segments. In alternative embodiments, as the vehicle 105 traverses a route, the example display may generate one or more shaded regions outside the route and further generate associated recommendations to modify the route to encounter the one or more shaded regions.

The system, apparatus, and methods described herein enable a map-based server/platform to provide a route based on user preferences regarding one or more sound types, thereby improving user experience. Additionally, it is contemplated that generating or updating a map layer that defines exact locations of sound generating sources may be resource intensive and impractical, since a plurality of detection entities proximate to a sound generating source is required to localize the location of the sound generating source and such sensors are generally unavailable at a given instance. As such, generating or updating a map layer that associates road segments to sound events is preferred since each association merely requires a single detection entity proximate to a road segment to record sound from a sound generating source.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
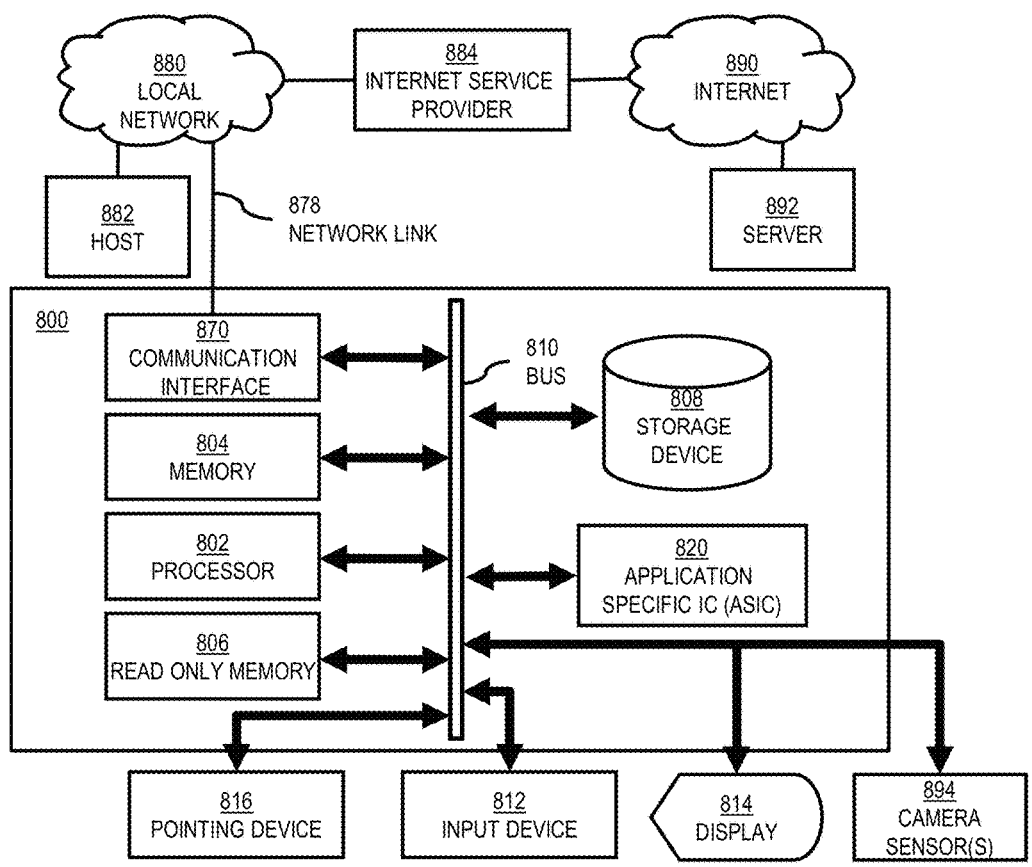
FIG. 8 illustrates a computer system upon which an embodiment may be implemented.

FIG. 8 illustrates a computer system 800 upon which an embodiment may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to providing a map layer of one or more sound events and generating a route using the map layer as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for providing a map layer of one or more sound events and generating a route using the map layer.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a map layer of one or more sound events and generating a route using the map layer. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for providing a map layer of one or more sound events and generating a route using the map layer. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a map layer of one or more sound events and generating a route using the map layer, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 123 for providing a map layer of one or more sound events and generating a route using the map layer to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 882 connected to the Internet hosts a process that provides a service in response to information received over the Internet. For example, server host 882 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 882 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment may be implemented. Chip set 900 is programmed to provide a map layer of one or more sound events and generate a route using the map layer, as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for providing a map layer of one or more sound events and generating a route using the map layer.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors. The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a map layer of one or more sound events and generate a route using the map layer. The memory 905 also stores the data associated with or generated by the execution of the inventive steps.

FIG. 10 is a diagram of exemplary components of a mobile terminal 1001 (e.g., a mobile device or vehicle or part thereof) for communications, which is capable of operating in the system of FIG. 1A, according to one embodiment. In some embodiments, mobile terminal 1001, or a portion thereof, constitutes a means for providing a map layer of one or more sound events and generating a route using the map layer. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a map layer of one or more sound events and generating a route using the map layer. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1021 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1021 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a map layer of one or more sound events and generate a route using the map layer. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1061. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1061 stores various data including call incoming tone data and is capable of storing other data including music data received via, e.g., the global Internet. The software module could reside in RAM memory, flash memory, registers, or any other form of writable storage medium known in the art. The memory device 1061 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1063 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   collect first sound data captured by a sound capturing device at or proximate to a road segment;
   determine whether the first sound data correspond to a sound type associated with a database including a map layer;
   responsive to the first sound data corresponding to the sound type, generate a first data point for the map layer, wherein the first data point associates the sound type to the road segment;

responsive to the first sound data not corresponding to the sound type or any other sound types stored in the database, collect second sound data captured by other sound capturing devices within a predetermined distance from a location at which the sound capturing device captured the first sound data;

determine whether the second sound data corresponds to the sound type or one of any other sound types stored in the database;

responsive to the second sound data corresponding to the sound type or the one of any other sound types stored in the database:
  classify the first sound data as corresponding to the sound type or the one of any other sound types stored in the database;
  generate the first data point or a second data point, wherein the second data point associates the one of any other sound types to the road segment;

store the first data point or the second data point in the database, wherein the map layer comprises: (i) the first data point or the second data point; and (ii) one or more other data points that associate the sound type or one or more other sound types to one or more other road segments;

receive a user preference indicating the sound type;

identify the road segment associated with the sound type from a plurality of road segments within the map layer;

select a subset from the plurality of road segments as a route based on association of the subset with respect to the road segment; and cause a user interface to output the route.

2. The apparatus of claim 1, wherein the computer program code instructions are further configured to, when executed, cause the apparatus to select the subset such that the subset includes the road segment.

3. The apparatus of claim 1, wherein the computer program code instructions are further configured to, when executed, cause the apparatus to select the subset such that the subset excludes the road segment.

4. The apparatus of claim 1, wherein the road segment is a first road segment, wherein the route is a first route, and wherein the computer program code instructions are further configured to, when executed, cause the apparatus to:
  identify a second road segment associated with the sound type from the plurality of road segments; and
  modify the subset using the plurality of road segments to generate a second route, wherein the second route includes the first road segment and the second road segment.

5. The apparatus of claim 4, wherein an order of which the first segment and the second segment are provided within the second route is based on an estimated amount of time required for a vehicle to reach the first road segment or the second road segment.

6. The apparatus of claim 1, wherein the user preference indicates a sound attribute, wherein the road segment is a first road segment, wherein the subset is a first subset, wherein the route is a first route, and wherein the computer program code instructions are further configured to, when executed, cause the apparatus to:
  identify a second road segment associated with the sound attribute from the plurality of road segments;
  select a second subset from the plurality of road segments as a second route based on association of the second subset with respect to the second road segment; and
  output the second route.

7. A non-transitory computer-readable storage medium having computer program code instructions stored therein, the computer program code instructions, when executed by at least one processor, cause the at least one processor to:
  identify a road segment associated with a sound type from a plurality of road segments forming a route, wherein the sound type is selected based on a user preference;
  track a location of a vehicle with respect to the road segment;
  responsive to the vehicle being within the road segment, cause an external camera of the vehicle to detect a source associated with the sound type;
  responsive to detecting the source, cause an internal camera of the vehicle to track a field-of-vision (FOV) of an occupant of the vehicle;
  determine a position of the source with respect to the FOV; and
  responsive to the source being within the FOV, cause the vehicle to enable sound generated by the source to be provided to the occupant.

8. The non-transitory computer-readable storage medium of claim 7, wherein the computer program code instructions, when executed by at least one processor, cause the at least one processor to identify the road segment using a map layer, and wherein the map layer includes a data point that associates the sound type to the road segment and one or more other data points that associates one or more other sound types to one or more other road segments among the plurality of road segments.

9. The non-transitory computer-readable storage medium of claim 7, wherein the computer program code instructions, when executed by at least one processor, cause the at least one processor to, responsive to the vehicle being within the road segment, generate a signal causing a portion of an interior of the vehicle to be exposed to an environment outside the vehicle.

10. The non-transitory computer-readable storage medium of claim 7, wherein the computer program code instructions, when executed by at least one processor, cause the at least one processor to, responsive to the vehicle being within the road segment, generate a signal that causes the vehicle to capture sound outside the vehicle and generate the sound within a cabin of the vehicle.

11. The non-transitory computer-readable storage medium of claim 7, wherein the computer program code instructions, when executed by at least one processor, cause the at least one processor to:
  responsive to the vehicle being within the road segment, cause an external camera of the vehicle to detect a source associated with the sound type; and
  responsive to detecting the source, cause the vehicle to enable sound generated by the source to be provided to the occupant.

12. The non-transitory computer-readable storage medium of claim 7, wherein the computer program code instructions, when executed by at least one processor,
  cause the at least one processor to, for one or more other road segments of the plurality of road segments, cause the vehicle to drive at a first speed; and
  responsive to the vehicle being within the road segment, cause the vehicle to drive at a second different speed.

13. A method of providing navigation information, the method comprising:
  collecting first sound data captured by a sound capturing device at or proximate to a road segment;

determining whether the first sound data correspond to a sound type associated with a database including a map layer;

responsive to the first sound data corresponding to the sound type, generating a first data point for the map layer, wherein the first data point associates the sound type to the road segment;

responsive to the first sound data not corresponding to the sound type or any other sound types stored in the database, collecting second sound data captured by other sound capturing devices within a predetermined distance from a location at which the sound capturing device captured the first sound data;

determining whether the second sound data corresponds to the sound type or one of any other sound types stored in the database;

responsive to the second sound data corresponding to the sound type or the one of any other sound types stored in the database:

classifying the first sound data as corresponding to the sound type or the one of any other sound types stored in the database;

generating the first data point or a second data point, wherein the second data point associates the one of any other sound types to the road segment; and storing the first data point or the second data point in the database, wherein the map layer comprises: (i) the first data point or the second data point; and (ii) one or more other data points that associate the sound type or one or more other sound types to one or more other road segments;

generating navigation information based on one or more data points stored in the database; and causing a user interface to output the navigation information.

14. The method of claim 13, wherein the method further comprises:

receiving a user preference indicating the sound type;

generating a route based on the user preference and the one or more data points stored in the database; and causing the user interface to output the route.

* * * * *